J. MAINS.
CORN HARVESTER.

No. 74,104.                    Patented Feb. 4, 1868.

Witnesses:                         Inventor:

United States Patent Office.

JAMES MAINS, OF OLENA, ILLINOIS.

*Letters Patent No. 74,104, dated February 4, 1868.*

---

IMPROVEMENT IN CORN-HARVESTERS.

---

*The Schedule referred to in these Letters Patent and making part of the same.*

---

TO ALL WHOM IT MAY CONCERN:

Be it known that I, JAMES MAINS, of Olena, in the county of Henderson, and State of Illinois, have invented a new and useful Improvement in Corn-Gatherers; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved machine for gathering the corn, simple and inexpensive in construction, and effective in operation; and it consists in the construction and combination of the various parts of the machine as hereinafter more fully described.

Figure 1:
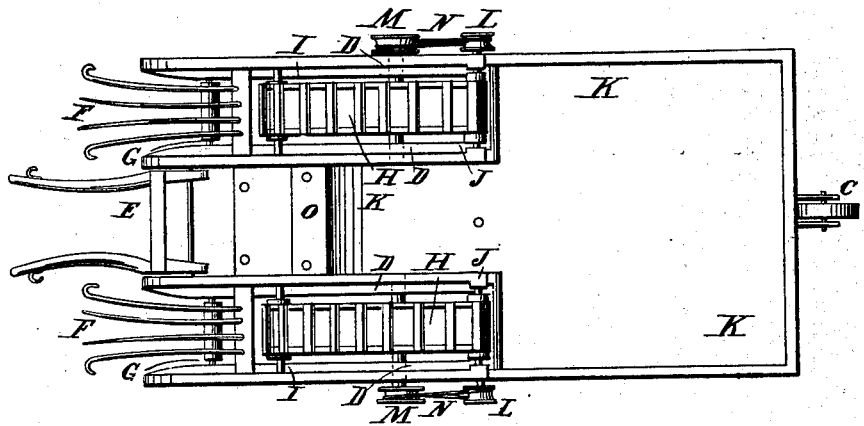
Figure 1 is a top or plan view of my improved machine.
Figure 2:
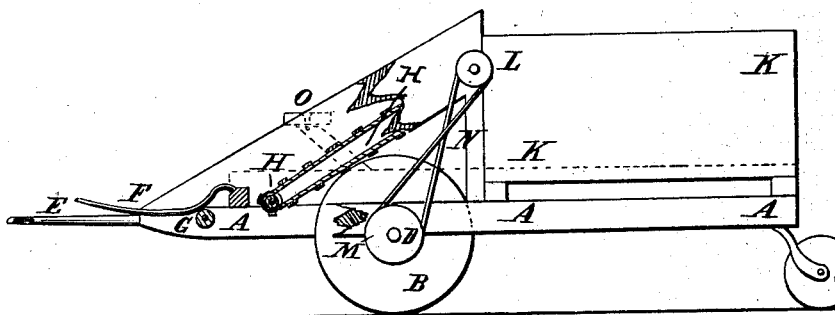
Figure 2 is a side view of the same, part being broken away to show the construction.

A is the frame of the machine, which is supported upon the wheels B and C. The wheels B are rigidly attached to axles D, that revolve in bearings attached to the frame A. The wheel C is a caster-wheel, which is pivoted to the central part of the rear end of the frame A, as shown in fig. 1. E are the thills, which are attached to the central part of the forward end of the frame A, so that the horse or horses may walk between the rows. The gatherers F are placed in and are attached to the forward part of the frame A, upon each side of the central part to which the thills E are attached. The gatherers F are formed of polished iron rods, one inch or three-quarters of an inch in thickness. These rods are placed about one and a half inch apart, and are of such a number that the gatherers may be about a foot wide. The gatherers F should be about four and a half feet long, so as to reach the second hill before the first one is broken down, and the forward ends of the outer rods are bent or curved outward, so that they may gather up the bent or scattering stalks. G are rollers placed beneath the rear part of the gatherers F, to bend the stalks down gradually without breaking them. The wheels B are made about two feet in diameter, and ten inches wide, and are placed directly in the rear of the gatherers F, and at such a distance from them that they may crush down the stalks and hold them, to prevent them from being drawn out of the ground while the ears are being stripped off by the gatherers F. From the gatherers F the ears pass back to the elevators H, which may be made of coarse canvas, having strips of leather about two inches wide attached to its edges, to which may be attached cleats, provided with teeth or claws to take hold of the ears and carry them up the elevator. The elevator-belts pass around and are operated by two rollers, I and J. The roller I is pivoted to the frame A a little below and close to the rear end of the gatherers F, and the upper roller J is pivoted close to the upper edge of the box K, so that the ears carried up by the elevators may fall into said box. The outer journals of the upper rollers J project outward, and to them are attached pulleys L, around which, and around the pulleys M, attached to the projecting ends of the axle D of the wheels B, pass bands N, so that the elevators may be operated by the advance of the machine. The middle part of the box K extends forward between the elevators H, and its forward end-board is made to incline forward, as shown in dotted lines in fig. 2, for convenience in beginning to shovel in unloading. O is the seat, which is removably attached to the upper edge of the forward end-board, so that it may be conveniently removed when unloading.

I claim as new, and desire to secure by Letters Patent—

The combination of the gatherers F and elevators H, constructed and operated substantially as described, with the frame A, and box K, said box being made substantially in the shape and manner herein shown and described.

The above specification of my invention signed by me, this sixteenth day of August, 1867.

JAMES MAINS.

Witnesses:
THOS. NICHOLS,
A. MAINS.